United States Patent
Stieg

(10) Patent No.: US 9,242,771 B2
(45) Date of Patent: Jan. 26, 2016

(54) REUSABLE CANNING LID

(71) Applicant: Loren Charles Stieg, Reed City, MI (US)

(72) Inventor: Loren Charles Stieg, Reed City, MI (US)

( * ) Notice: Subject to any disclaimer, the term of this patent is extended or adjusted under 35 U.S.C. 154(b) by 0 days.

(21) Appl. No.: 14/521,670

(22) Filed: Oct. 23, 2014

(65) Prior Publication Data

US 2015/0321805 A1    Nov. 12, 2015

Related U.S. Application Data

(60) Provisional application No. 61/996,383, filed on May 7, 2014.

(51) Int. Cl.
  *B65D 51/16* (2006.01)
  *B65D 51/14* (2006.01)
  *B65D 45/30* (2006.01)

(52) U.S. Cl.
  CPC ............ *B65D 51/145* (2013.01); *B65D 45/305* (2013.01)

(58) Field of Classification Search
  CPC ....... B65D 51/16; B65D 51/145; B65D 47/06
  USPC ............ 220/295, 293, 304; 215/43, 277, 341; 53/510, 88, 103; 222/428
  See application file for complete search history.

(56) References Cited

U.S. PATENT DOCUMENTS

2008/0149516 A1*  6/2008  Bruzzese ................ A63F 9/001
                                                             206/457
2015/0108132 A1*  4/2015  McGirr ................ B65D 1/0253
                                                             220/304

OTHER PUBLICATIONS

Website for "Tattler Reusable Canning Lids" archived webpage for http://reusablecanninglids.com dated May 2, 2012, obtained from https://web.archive.org.

* cited by examiner

*Primary Examiner* — Anthony Stashick
*Assistant Examiner* — Raven Collins
(74) *Attorney, Agent, or Firm* — Oppenhuizen Law PLC; David L. Oppenhuizen

(57) ABSTRACT

A reusable lid for use with a jar for canning food. The reusable lid comprises a circular disc having a top side with an upper surface, a bottom side with a planar lower surface extending about the outer circumferential section of the disc, and a ring extending outwardly from the lower surface. The second planar surface on the top side of the disc is lowered from the upper surface by a measurement in the range of 0.015" to 0.035", and extends along a circumferential segment that extends between 54° and 144° of the radial circumference of the disc.

20 Claims, 4 Drawing Sheets

REUSABLE CANNING LID

CROSS REFERENCE TO RELATED APPLICATION

This application claims the benefit of U.S. Provisional Application 61/996,383, which was filed on May 7, 2014, the disclosure of which is hereby incorporated by reference.

BACKGROUND OF THE INVENTION

1. Field of the Invention

The present invention pertains to a reusable canning lid for use with canning food.

2. Description of the Prior Art

Metal lids canning lids are well-known to those who can food. These lids have an outer perimeter that is contoured to mate atop a typical glass canning jar. The bottom surface of the lid includes a gummy substance, or sealing compound, that provides the seal between the lid and the jar.

In use, food is placed in the jar and the lid is tightened on the top of the jar using a threaded ring, or screw band. The jar is then placed in a hot water bath or pressure cooker and the food is processed according to the requirements for that particular food item. During processing, the heated seal is softened, which allows pressurized air inside the jar to escape. The jar is then removed from the water bath once processing is complete. It is fairly common for the screw band to loosen up during processing, and so it is common practice to make sure that the screw band is tight upon removal from the heat. This helps ensure that the lid forms a seal with the jar, thereby creating a vacuum inside the jar when the contents have cooled. It is understood that this vacuum holds the lid tightly over jar and keeps the jar's contents sterile and preserved for a year or longer. Once the jar and its contents have cooled, the resulting vacuum is sufficient to hold the lid on the jar, and the screw band is preferably removed.

However, an inherent problem with metal lids is that they are not reusable. The gummy seal on the lids is only designed for a single use. Since many people who can food are fairly prolific, a need has been created for a reusable canning lid.

In reaction to that need, the inventor of the present invention previously invented a first-generation reusable canning lid. That canning lid is made from plastic and uses a ring gasket instead of the gummy seal found on a metal lid. The ring gasket is a separate piece from the plastic lid, but it is reusable along with the plastic lid. This product has been successful in the marketplace for many years.

However, this first-generation reusable canning lid must be used in a slightly different, yet specific, manner than traditional metal canning lids. The ring gasket on the reusable canning lid does not allow the heated jar to vent in the same way as the gummy seal on metal lids. Therefore, the screw band on the reusable canning lid must be tightened onto the jar (over the lid and ring gasket), and then slightly loosened in order to allow the ring gasket and the lid to vent. Once processing is completed, and while the jar is still hot, the screw band is then tightened securely to ensure a seal between the lid, the ring gasket, and the top of the jar. This method of use must be used for the first-generation reusable lid to ensure that the jar both properly vents during processing, and forms a seal during cooling.

That product was met with positive reviews from many customers who have reused that invention year after year, some customers having used their reusable canning lids for decades. However, there is an inherent learning curve involved with the process of initially tightening and then incrementally loosening the screw bands. The objective is to tighten the screw band to a specific torque range, but to achieve that torque range using nothing more than feel by the user. Moreover, users of the product vary in age, gender, health, and strength, and achieving the proper torque level for all users can be a challenge. Furthermore, the step of finger tightening the screw band and then slightly loosening the ring is very counterintuitive to those who are used to using traditional metal lids because those lids do not require the screw band to be loosened whatsoever.

This product was very well-received by those who had mastered the learning curve and were comfortable with using that product. However, product development continued for some time to address the issue of properly tightening the screw bands on the jars, including the potential use of placing indicator lines on the canning lid to help the user gauge how far to loosen the lid once it was tightened. Nonetheless, the problem of overcoming this learning curve was not discovered until recently.

As discussed hereinbelow, the inventor has addressed the issue of correctly tightening the screw band in a manner that is wholly unanticipated in light of the problem and previous attempted solution mentioned above.

The present invention, as is detailed hereinbelow, seeks to provide a canning lid that is fully reusable like its predecessor, but which is used by the customer in the same manner as a traditional metal lid and requires no additional training or skill to properly use the product.

SUMMARY OF THE INVENTION

In a first embodiment of the invention, there is provided a reusable lid for use with a jar for canning food comprising a circular disc having a top side with an upper surface, a bottom side with a planar lower surface extending about the outer circumferential section of the disc, and a ring extending outwardly from the lower surface. According to this embodiment, the improvement comprises a second planar surface on the top side of the disc which is lowered from the upper surface by a measurement in the range of 0.015" to 0.035". The second planar surface extends along a circumferential segment that extends between 54° and 144° of the radial circumference of the disc.

According to a second embodiment hereof, there is provided, in combination, a jar having an open threaded mouth, a reusable lid, a ring gasket, and a threaded screw band. The ring gasket is seated atop the mouth of the jar, the reusable lid is seated atop the ring gasket, and the screw band is positioned atop the reusable lid and threadingly engaged with the threaded mouth of the jar such that the jar, the gasket, the reusable lid, and the threaded screw band create an airtight seal within the jar when the screw band is tightened over the mouth of the jar. The reusable lid comprises a circular disc having a top side with an upper surface, a bottom side with a planar lower surface extending about the outer circumferential section of the disc, a ring extending outwardly from the lower surface, and a second planar surface on the top side of the disc. The second planar surface is lowered from the upper surface by a measurement in the range of 0.015" to 0.035", and the second planar surface extends along a circumferential segment that extends between 54° and 144° of the radial circumference of the disc.

Optionally, the circumferential segment can extend between 90° and 120° of the radial circumference of the disc.

Optionally, the disc is formed from a polymer material, and more preferably, the disc is formed from a Polyoxymethylene Copolymer (POM).

Optionally, the second planar surface is lowered from the upper surface by a measurement in the range of 0.020" to 0.030".

For a more complete understanding of the present invention, reference is made to the following detailed description and accompanying drawings. In the drawings, like reference characters refer to like parts throughout the views in which:

DETAILED DESCRIPTION OF THE PREFERRED EMBODIMENT

Figure 1:
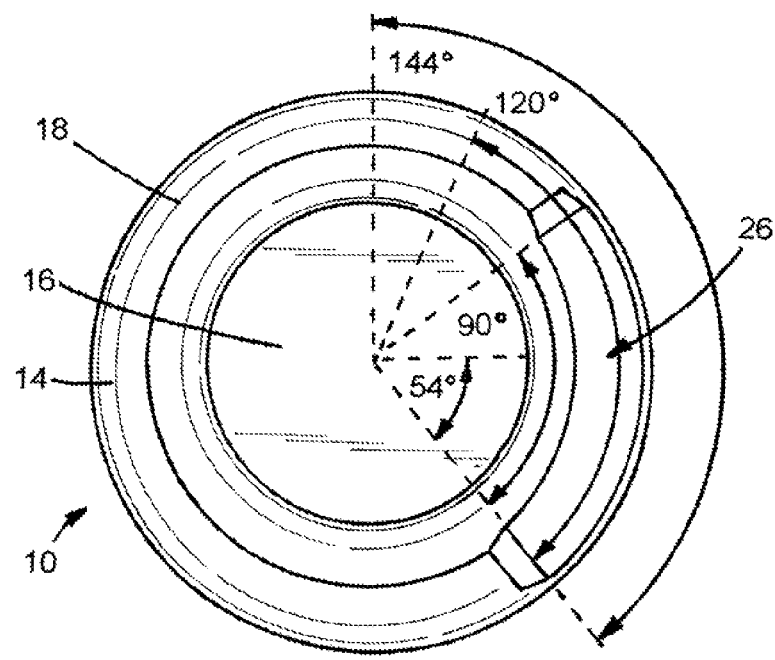
FIG. 1 is a top side view of the reusable canning lid.
Figure 2:
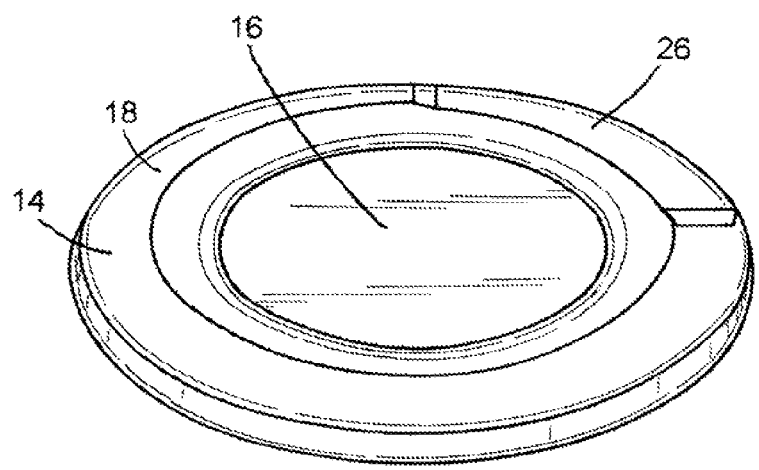
FIG. 2 is a perspective view of the reusable canning lid.
Figure 3:
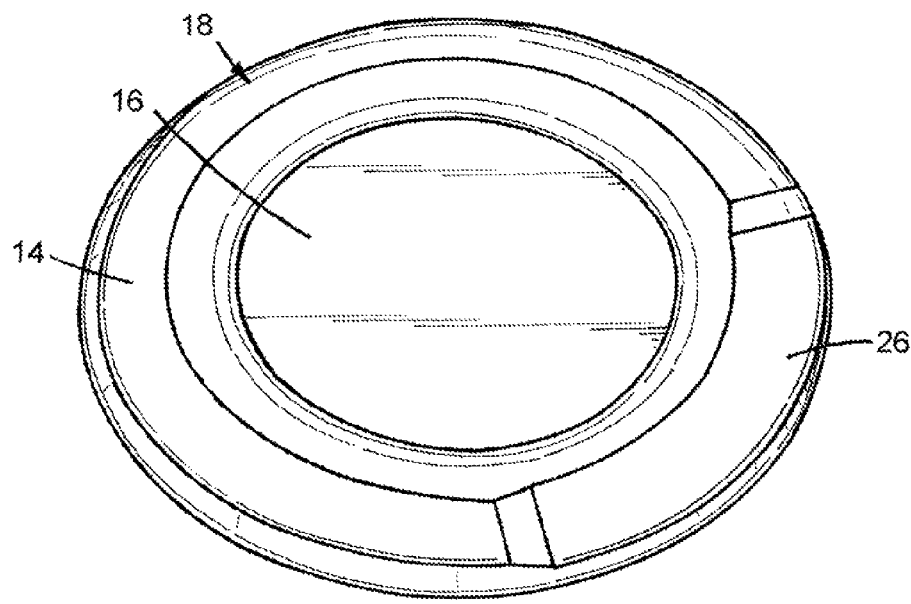
FIG. 3 is a second perspective view of the reusable canning lid.

As referenced throughout the following detailed description, the various directional terms "top," "bottom," "upper," "lower," and so forth are intended to refer to the orientation and positioning of the jar, the ring gasket, the lid, and the screw band in which the jar is positioned at the bottom (with the open mouth at the upper end), the ring gasket is positioned on top of the mouth of the jar, the lid is positioned on top of the ring gasket, and the screw band is positioned at the top over the lid.

In accordance with the present invention and as shown generally in FIGS. 1-6, there is provided a reusable lid 10 for use with a jar 12 for canning food comprising a circular disc 14 having a top side 16 with an outer perimetal upper surface 18, a bottom side 20 with a planar lower surface 22 extending about the outer circumferential section of the disc 14, and a ring 24 extending away and downwardly from the lower surface 22. With the exception of the second planar surface 26 discussed below, the upper surface 18 extends generally about the circumference on the top side 16 of the lid 10. The upper surface 18 engages with the screw band (not shown), as described in greater detail below.

Figure 4:
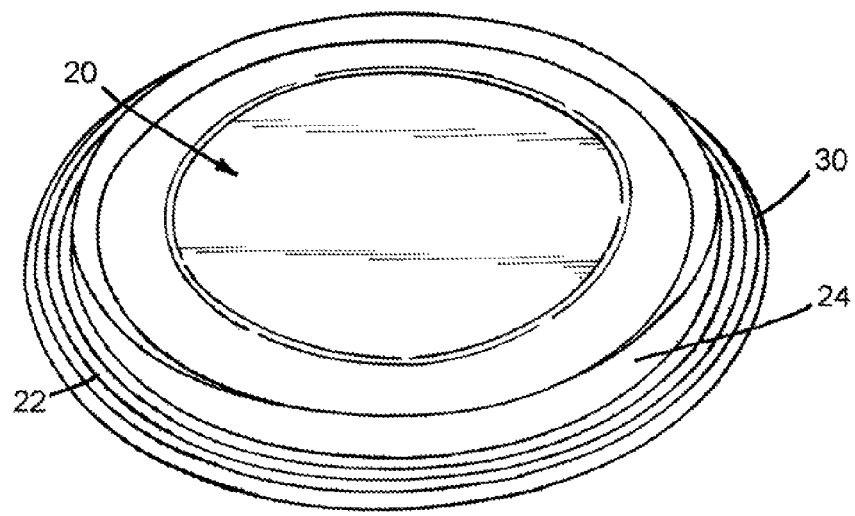
FIG. 4 is a perspective view of the bottom side of the canning lid.
Figure 5:
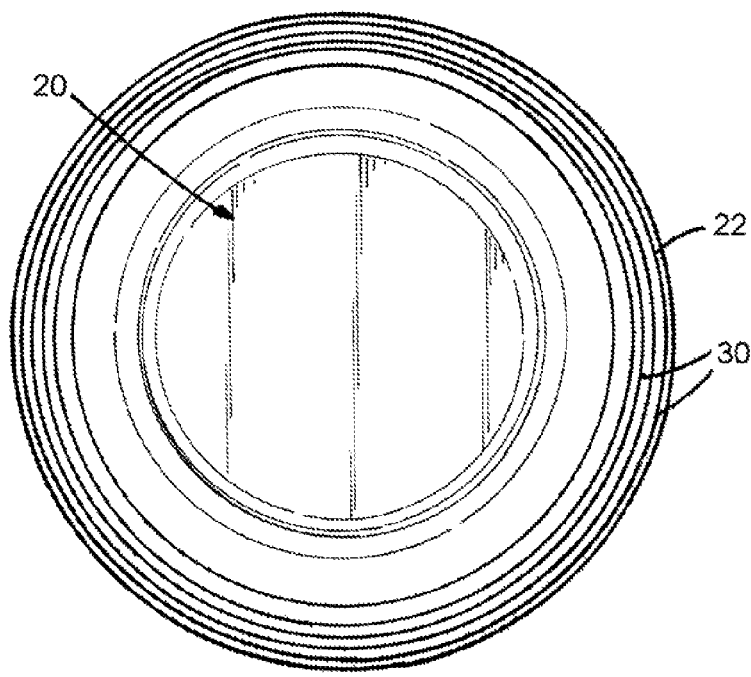
FIG. 5 is bottom side view of the reusable canning lid.

As shown in FIGS. 4 and 5, the bottom side 20 of the lid 10 includes the planar lower surface 22 which extends around the outer circumference of the disc 14. When the lid 10 is placed over the mouth of the jar 12, the ring gasket 28 is placed adjacent the lower surface 22 such that the ring gasket 28 is sandwiched between the lower surface 22 and the mouth of the jar 12. Optionally, the lower surface 22 can include a plurality of ridges 30 which engage with the ring gasket 28 to help form a tight seal between the ring gasket 28 and the lid 10.

The bottom side 20 of the disc 14 also includes a ring 24, or ridge, which extends downwardly from the disc 14. The ring 24 is positioned next to the lower surface 22, and the ring 24 and the lower surface 22 are preferably concentric with each other. The lid 10 has an axis (not shown) extending through the disc 14, and the ring 24 extends generally away from the body of the disc 14 in a direction parallel to the axis. In use, and as discussed below, the ring 24 is sized to sit inside the mouth of the jar 12 to ensure that the lid 10 is positioned correctly over the mouth of the jar 12. The ring 24 preferably extends about ³⁄₁₆" away from the lower surface 22 of the disc 14 and is positioned within the mouth of the jar 12 during use.

Figure 7:
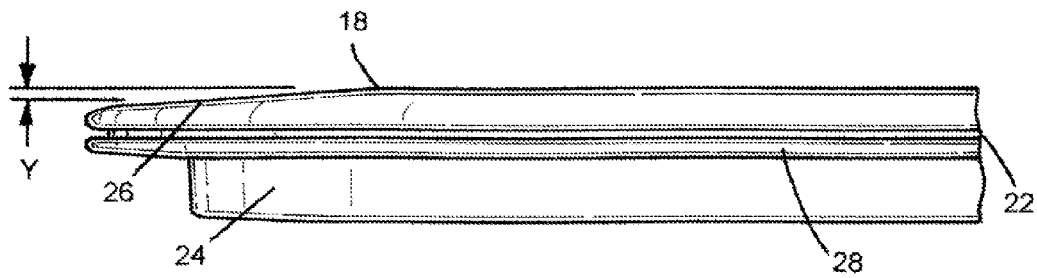
FIG. 7 is an enlarged side view showing the ring gasket positioned onto the reusable lid.
Figure 8:
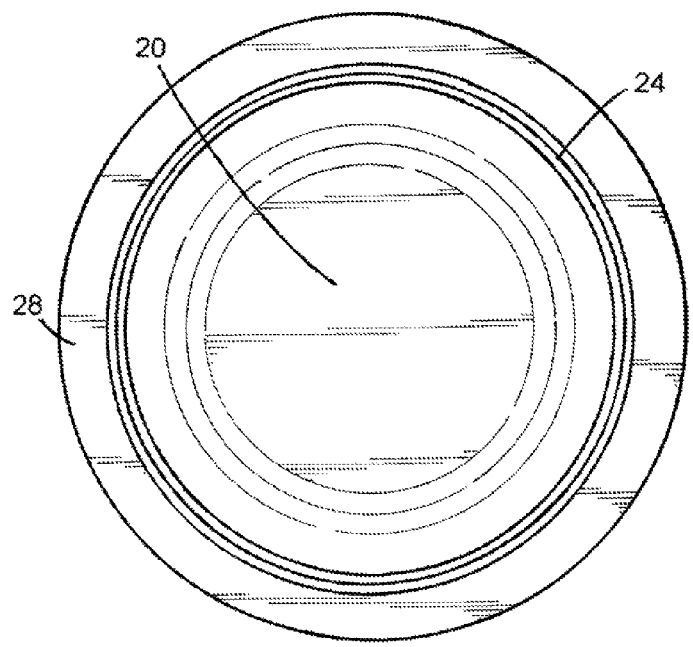
FIG. 8 is a bottom side view showing the ring gasket positioned onto the reusable lid.

Turning back to the top side 16 of the disc 14, there is provided a second planar surface 26 on the top side 16 of the disc 14 which is lowered from the upper surface 18 by a measurement in the range of 0.015" to 0.035", as shown as y in FIG. 7. More preferably, the second planar surface 26 is lowered from the upper surface 18 by a measurement in the range of 0.020" to 0.030". And even more preferably still, the second planar surface 26 is lowered from the upper surface 18 by 0.025".

The second planar surface 26 extends along a circumferential segment that extends between 54° and 144° of the radial circumference of the disc 14 as shown in FIG. 1. More preferably, the circumferential segment extends between 90° and 120° of the radial circumference of the disc 14.

The disc 14 comprises a single unitary piece which is preferably a polymer material formed by a process like injection molding. Even more preferably, the disc 14 is formed from a polymer that can withstand high heat without warping or disforming like Polyoxymethylene Copolymer (POM), such as the type sold under the trademark Celcon® M90 by Ticona.

Figure 6:
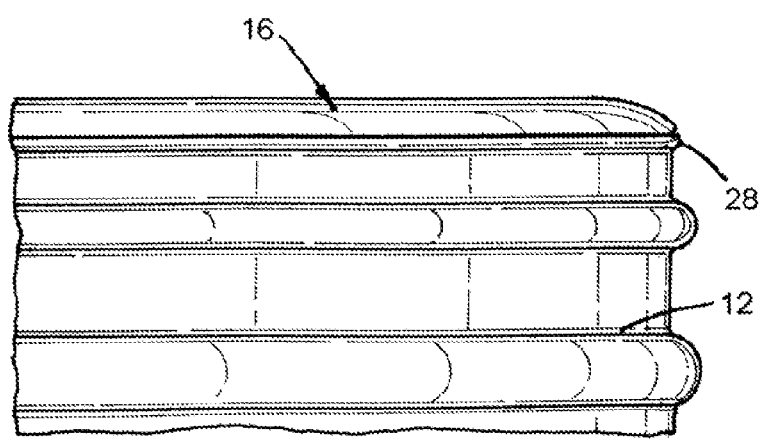
FIG. 6 is an enlarged front side view showing the reusable canning lid and the ring gasket positioned atop the mouth of the jar.

According to a second embodiment hereof, there is provided, in combination, the jar 12 having the open threaded mouth, the reusable lid 10, the ring gasket 28, and the threaded screw band. As shown in FIG. 6, the ring gasket 28 is seated atop the mouth of the jar 12, the reusable lid 10 is seated atop the ring gasket 28, and the screw band (not shown for purposes of more clearly displaying the lid 10 and ring gasket 28) is positioned atop the reusable lid 10 and threadingly engaged with the threaded mouth of the jar 12 so that the jar 12, the ring gasket 28, the reusable lid 10, and the threaded screw band create an airtight seal within the jar 12 when the screw band is tightened over the mouth of the jar 12.

The ring gasket 28 is circular in shape and has flat upper and lower surfaces to form an airtight seal against the lid 10 and the jar 12. The ring gasket 28 is formed from a pliable material that is resistant to high temperatures. Preferably the ring gasket 28 is formed from nitrile rubber.

Turning back to the user-related issues for the first-generation reusable lid in the prior art, the issue encountered with that reusable lid was that of properly securing the lid onto the jar at a torque that first allowed the lid to properly vent during processing, and then retightening the lid immediately after processing while the contents of the jar were still hot to properly seal the lid atop the jar. The difficulty came from properly securing the lid to the mouth of the jar at a torque that allowed the lid to properly vent. And as mentioned above, the efforts involved in overcoming this issue centered around determining how much the screw band should be loosened before processing the food in the jar.

The reusable lid 10 described herein overcomes this issue, not by helping the user properly torque the screw band onto the jar 12, but rather the reusable lid 10 vents while tightened like a traditional metal lid and therefore can be used the same way as a metal lid. Namely, the screw band is tightened securely over both the reusable lid 10 and the ring gasket 28 onto the mouth of the jar 12. During processing, the jar 12 and its contents are heated up. The second planar surface 26 provides a slight gap between the screw band and the upper surface 18 of the lid 10 where the second planar surface 26 is present. When the lid 10 is heated during processing, it becomes slightly pliable enough so that the gap between the screw band and second planar surface 26 allows the lid 10 to flex upwardly and bend just enough to allow the pressurized air in the jar 12 to escape between the mouth of the jar 12 and the lid 10. When processing is complete, the lid 10 and the ring gasket 28 maintain a seal over the mouth of the jar 12, despite the gap between the screw band and the second planar surface 26, because of the contact between the screw band and the upper surface 18. The jar 12, its contents, and the lid 10 then cool to room temperature and the lid 10 regains its full rigidity. The cooled contents in the jar 12 create a vacuum, thereby securing the lid 10 and the ring gasket 28 over the mouth of the jar 12 (without the assistance of the screw band). The lid 10 and the ring gasket 28 are formed from materials that can be re-used many time. In this manner, the reusable lid 10 can be used by the user in the same manner as traditional metal canning lids, and the reusable lid 10 is advantageous over the first generation product because it now vents in a similar manner as a metal lid as a result of the lowered second planar surface 26 and the resulting gap between the second planar surface 26 and the screw band, thereby eliminating the step of correctly tightening the lid 10 over the jar 12 to allow proper venting during processing.

According to the invention described above, a canning lid is provided which is reusable and which also vents similarly to traditional metal single-use canning lids.

What is claimed is:

1. A reusable lid for use with a jar for canning food comprising a circular disc having a top side with an upper surface, a bottom side with a planar lower surface extending about the outer circumferential section of the disc, and a ring extending outwardly from the lower surface;

wherein the improvement comprises a second planar surface on the top side of the disc, the second planar surface being lowered from the upper surface by a measurement in the range of 0.015" to 0.035", and the second planar surface extending along a circumferential segment that extends between 54° and 144° of the radial circumference of the disc.

2. The reusable lid of claim 1 wherein the circumferential segment extends between 90° and 120° of the radial circumference of the disc.

3. The reusable lid of claim 2 wherein the disc is formed from a polymer material.

4. The reusable lid of claim 3 wherein the disc is formed from a Polyoxymethylene Copolymer (POM).

5. The reusable lid of claim 2 wherein the second planar surface is lowered from the upper surface by a measurement in the range of 0.020" to 0.030".

6. The reusable lid of claim 5 wherein the disc is formed from a polymer material.

7. The reusable lid of claim 6 wherein the disc is formed from a Polyoxymethylene Copolymer (POM).

8. The reusable lid of claim 1 wherein the second planar surface is lowered from the upper surface by a measurement in the range of 0.020" to 0.030".

9. The reusable lid of claim 8 wherein the disc is formed from a polymer material.

10. The reusable lid of claim 9 wherein the disc is formed from a Polyoxymethylene Copolymer (POM).

11. The reusable lid of claim 1 wherein the disc is formed from a polymer material.

12. The reusable lid of claim 11 wherein the disc is formed from a Polyoxymethylene Copolymer (POM).

13. In combination, a jar having an open threaded mouth, a reusable lid, a ring gasket, and a threaded screw band;

the ring gasket being seated atop the mouth of the jar, the reusable lid being seated atop the ring gasket, and the screw band being positioned atop the reusable lid and threadingly engaged with the threaded mouth of the jar such that the jar, the gasket, the reusable lid, and the threaded screw band create an airtight seal within the jar;

the reusable lid comprising a circular disc having a top side with an upper surface, a bottom side with a planar lower surface extending about the outer circumferential section of the disc, a ring extending outwardly from the lower surface, and a second planar surface on the top side of the disc, the second planar surface being lowered from the upper surface by a measurement in the range of 0.015" to 0.035", and the second planar surface extending along a circumferential segment that extends between 54° and 144° of the radial circumference of the disc.

14. The combination of claim 13 wherein the circumferential segment extends between 90° and 120° of the radial circumference of the disc.

15. The combination of claim 14 wherein the second planar surface is lowered from the upper surface by a measurement in the range of 0.020" to 0.030".

16. The combination of claim 15 wherein the disc is formed from a Polyoxymethylene Copolymer (POM).

17. The combination of claim 13 wherein the second planar surface is lowered from the upper surface by a measurement in the range of 0.020" to 0.030".

18. The combination of claim 17 wherein the disc is formed from a Polyoxymethylene Copolymer (POM).

19. The combination of claim 13 wherein the disc is formed from a polymer material.

20. The combination of claim 19 wherein polymer material is a Polyoxymethylene Copolymer (POM).

* * * * *